United States Patent
Livshiz et al.

(10) Patent No.: US 7,856,304 B2
(45) Date of Patent: Dec. 21, 2010

(54) ENGINE TORQUE CONTROL

(75) Inventors: Michael Livshiz, Ann Arbor, MI (US);
Jeffrey M. Kaiser, Highland, MI (US);
Christopher E. Whitney, Highland, MI (US); John A. Jacobs, Fenton, MI (US);
Richard B. Jess, Haslett, MI (US)

(73) Assignee: GM Global Technology Operations, Inc.

( * ) Notice: Subject to any disclaimer, the term of this patent is extended or adjusted under 35 U.S.C. 154(b) by 83 days.

(21) Appl. No.: 11/769,797

(22) Filed: Jun. 28, 2007

(65) Prior Publication Data

US 2008/0121212 A1 May 29, 2008

Related U.S. Application Data

(60) Provisional application No. 60/861,492, filed on Nov. 28, 2006, provisional application No. 60/861,493, filed on Nov. 28, 2006.

(51) Int. Cl.
*F02D 31/00* (2006.01)

(52) U.S. Cl. ...................................... 701/103; 123/352

(58) Field of Classification Search ................ 123/350, 123/352, 349, 361, 369, 399, 436; 701/101, 701/102, 103, 104, 105, 110, 111, 114, 115
See application file for complete search history.

(56) References Cited

U.S. PATENT DOCUMENTS

| 5,080,064 | A * | 1/1992 | Buslepp et al. | 123/399 |
|---|---|---|---|---|
| 6,311,670 | B1 * | 11/2001 | Constancis | 123/352 |
| 6,463,913 | B1 * | 10/2002 | Kotwicki et al. | 123/488 |
| 6,499,449 | B2 * | 12/2002 | Michelini et al. | 123/90.15 |
| 6,976,471 | B2 * | 12/2005 | Stroh | 123/399 |
| 7,004,144 | B2 * | 2/2006 | Stroh et al. | 123/399 |
| 7,021,282 | B1 * | 4/2006 | Livshiz et al. | 123/347 |
| 7,044,101 | B1 * | 5/2006 | Duty et al. | 123/198 F |
| 7,200,508 | B2 * | 4/2007 | Geyer et al. | 702/96 |
| 7,275,426 | B2 * | 10/2007 | Lahti et al. | 73/114.32 |
| 7,296,550 | B2 * | 11/2007 | Trask et al. | 123/179.18 |
| 7,302,335 | B1 * | 11/2007 | Xiao | 701/103 |
| 7,319,929 | B1 * | 1/2008 | Davis et al. | 701/102 |

* cited by examiner

*Primary Examiner*—Stephen K Cronin
*Assistant Examiner*—Johnny H Hoang

(57) ABSTRACT

A method of achieving a desired torque output of an internal combustion engine includes determining a first air-per-cylinder (APC) value based on a first APC relationship and determining a second APC value based on a second APC relationship. An APC error is determined based on the second APC value. Operation of the engine is regulated based on the first APC value when the APC error is greater than a threshold error. Operation of the engine based on the second APC value when the APC error is not greater than the threshold error.

20 Claims, 3 Drawing Sheets

ENGINE TORQUE CONTROL

CROSS-REFERENCE TO RELATED APPLICATIONS

This application is related to U.S. Patent Application Ser. No. 60/861,492, filed Nov. 28, 2006, entitled, "Torque Based Engine Speed Control". This application claims the benefit of U.S. Provisional Application No. 60/861,493, filed on Nov. 28, 2006. The disclosures of the above applications are incorporated herein by reference.

FIELD

The present invention relates to internal combustion engines, and more particularly to engine torque control.

BACKGROUND

Internal combustion engines combust an air and fuel mixture within cylinders to drive pistons, which produces drive torque. Air flow into the engine is regulated via a throttle. More specifically, the throttle adjusts throttle area, which increases or decreases air flow into the engine. As the throttle area increases, the air flow into the engine increases. A fuel control system adjusts the rate that fuel is injected to provide a desired air/fuel mixture to the cylinders. As can be appreciated, increasing the air and fuel to the cylinders increases the torque output of the engine.

Engine control systems have been developed to accurately control engine torque output to achieve a desired engine torque. Traditional engine control systems, however, do not control the engine torque as accurately as desired. Further, traditional engine control systems do not provide as rapid of a response to control signals as is desired or coordinate engine torque control among various devices that affect engine torque output. In some instances, traditional engine torque control systems result in engine stall and unexpected accelerations.

SUMMARY

Accordingly, the present disclosure provides a method of achieving a desired torque output of an internal combustion engine. The method includes determining a first air-per-cylinder (APC) value based on a first APC relationship and determining a second APC value based on a second APC relationship. An APC error is determined based on the second APC value. Operation of the engine is regulated based on the first APC value when the APC error is greater than a threshold error. Operation of the engine based on the second APC value when the APC error is not greater than the threshold error.

In another feature, the method further includes determining a torque request. Each of the first and second APC values is determined based on the torque request.

In another feature, the APC error is further determined based on the first APC value.

In still other features, the method further includes calculating a desired mass air flow (MAF) based on one of the first APC value and the second APC value. A desired throttle area is calculated based on the desired MAF, wherein engine operation is regulated based on the desired throttle area.

In yet another feature, each of the first and second APC relationships is determined based on an APC-based torque model of the engine.

Further advantages and areas of applicability of the present disclosure will become apparent from the detailed description provided hereinafter. It should be understood that the detailed description and specific examples, while indicating an embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
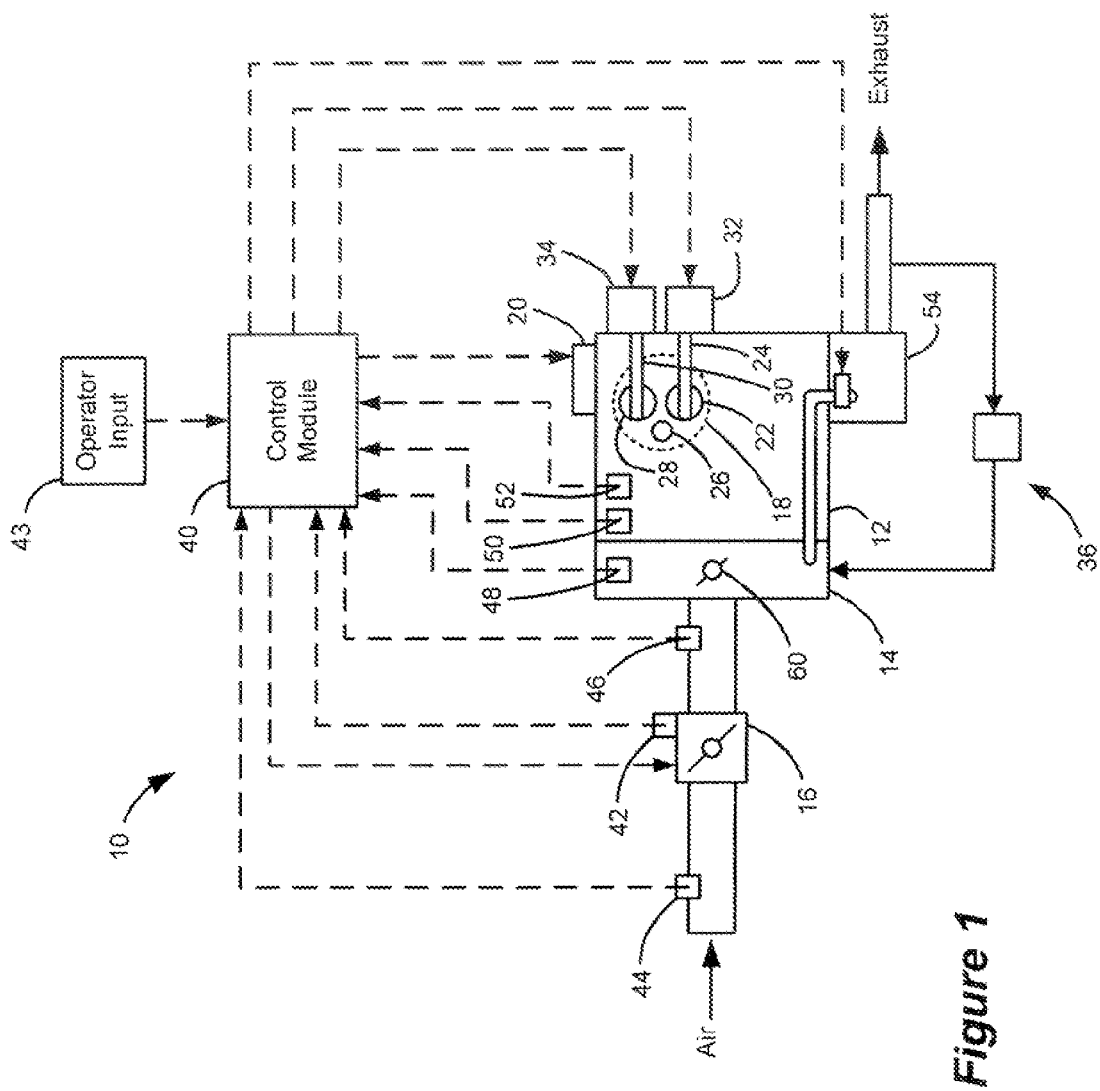
FIG. 1 is a schematic illustration of an exemplary engine system according to the present disclosure.

The following description is merely exemplary in nature and is in no way intended to limit the disclosure, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, or other suitable components that provide the described functionality.

Referring now to FIG. 1, an engine system 10 includes an engine 12 that combusts an air and fuel mixture to produce drive torque. Air is drawn into an intake manifold 14 through a throttle 16. The throttle 16 regulates mass air flow into the intake manifold 14. Air within the intake manifold 14 is distributed into cylinders 18. Although a single cylinder 18 is illustrated, it can be appreciated that the coordinated torque control system of the present invention can be implemented in engines having a plurality of cylinders including, but not limited to, 2, 3, 4, 5, 6, 8, 10 and 12 cylinders.

A fuel injector (not shown) injects fuel that is combined with the air as it is drawn into the cylinder 18 through an intake port. The fuel injector may be an injector associated with an electronic or mechanical fuel injection system 20, a jet or port of a carburetor or another system for mixing fuel with intake air. The fuel injector is controlled to provide a desired air-to-fuel (A/F) ratio within each cylinder 18.

An intake valve 22 selectively opens and closes to enable the air/fuel mixture to enter the cylinder 18. The intake valve position is regulated by an intake cam shaft 24. A piston (not shown) compresses the air/fuel mixture within the cylinder 18. A spark plug 26 initiates combustion of the air/fuel mixture, which drives the piston in the cylinder 18. The piston, in turn, drives a crankshaft (not shown) to produce drive torque. Combustion exhaust within the cylinder 18 is forced out an exhaust port when an exhaust valve 28 is in an open position. The exhaust valve position is regulated by an exhaust cam shaft 30. The exhaust is treated in an exhaust system and is released to atmosphere. Although single intake and exhaust valves 22,28 are illustrated, it can be appreciated that the engine 12 can include multiple intake and exhaust valves 22,28 per cylinder 18.

The engine system 10 can include an intake cam phaser 32 and an exhaust cam phaser 34 that respectively regulate the rotational timing of the intake and exhaust cam shafts 24,30. More specifically, the timing or phase angle of the respective intake and exhaust cam shafts 24,30 can be retarded or advanced with respect to each other or with respect to a location of the piston within the cylinder 18 or crankshaft position. In this manner, the position of the intake and exhaust valves 22,28 can be regulated with respect to each other or with respect to a location of the piston within the cylinder 18. By regulating the position of the intake valve 22 and the exhaust valve 28, the quantity of air/fuel mixture ingested into the cylinder 18 and therefore the engine torque is regulated.

The engine system 10 can also include an exhaust gas recirculation (EGR) system 36. The EGR system 36 includes an EGR valve 38 that regulates exhaust flow back into the intake manifold 14. The EGR system is generally implemented to regulate emissions. However, the mass of exhaust air that is circulated back into the intake manifold 14 also affects engine torque output.

A control module 40 operates the engine based on the torque-based engine speed control of the present disclosure. More specifically, the control module 40 generates a throttle control signal and a spark advance control signal based on a desired engine speed ($RPM_{DES}$). A throttle position signal generated by a throttle position sensor (TPS) 42. An operator input 43, such as an accelerator pedal, generates an operator input signal. The control module 40 commands the throttle 16 to a steady-state position to achieve a desired throttle area ($A_{THRDES}$) and commands the spark timing to achieve a desired spark timing ($S_{DES}$). A throttle actuator (not shown) adjusts the throttle position based on the throttle control signal.

An intake air temperature (IAT) sensor 44 is responsive to a temperature of the intake air flow and generates an intake air temperature (IAT) signal. A mass airflow (MAF) sensor 46 is responsive to the mass of the intake air flow and generates a MAF signal. A manifold absolute pressure (MAP) sensor 48 is responsive to the pressure within the intake manifold 14 and generates a MAP signal. An engine coolant temperature sensor 50 is responsive to a coolant temperature and generates an engine temperature signal. An engine speed sensor 52 is responsive to a rotational speed (i.e., RPM) of the engine 12 and generates in an engine speed signal. Each of the signals generated by the sensors is received by the control module 40. The engine system 10 can also include a turbo or supercharger 54 that is driven by the engine 12 or engine exhaust.

The engine torque control of the present disclosure achieves a desired engine torque ($T_{DES}$) based on a target air-per-cylinder (APC) calculation. More specifically, the engine torque control determines APC based on a torque request ($T_{REQ}$) using one of two equations derived from an APC-based engine torque model, as explained in further detail below. If an APC error ($APC_{ERR}$) is below a threshold error ($ERR_{THR}$), the engine torque control implements the second equation, which avoids engine stall and unexpected engine RPM increases. $T_{REQ}$ is determined based on an operator input (e.g., an accelerator pedal position) and can be influenced by other factors. An exemplary method of determining $T_{REQ}$ is described in commonly assigned, co-pending U.S. patent App. Ser. No. 60/861,492, filed Nov. 28, 2006, the disclosure of which is expressly incorporated herein by reference.

A torque model is presented as a second or higher order polynomial. For example, an exemplary torque model is presented by the following relationship:

$$T = a_{A^2} * APC^2 + a_A * APC + a_s * S + \quad (1)$$
$$a_{s^2} * S^2 + a_{AS} * APC * S + a_{AS^2} * APC * S^2 + a_0$$

where:
  is an ignition timing; and
  T is the torque.

The coefficients $a_i$ are determined based on engine RPM, an intake valve timing (I) and an exhaust valve timing (E). More specifically, the coefficients $a_i$ are pre-calibrated and stored in a three-dimensional look-up tables wherein RPM, I and E are inputs to the look-up tables. Equation 1 can be rewritten in accordance with the following relationship:

$$T = b_1(RPM, I, E, S) * APC^2 + \quad (2)$$
$$b_2(RPM, I, E, S) * APC + b_3(RPM, I, E, S)$$

The coefficients $b_i$ parallel the coefficients $a_i$, described above, in that they are pre-calibrated, pre-stored values that are determined based on RPM, I and E.

Equation 2 can be inverted to provide a first APC equation described by the following relationship:

$$APC = \frac{-b_2 + \sqrt{b_2 - 4 * b_1 * (b_3 - T)}}{b_1} \quad (3)$$

Under some engine operating conditions, however, the coefficient $b_1$ can be small, wherein division by zero and an improper square root calculation are possible. This can result in engine stall or undesired engine RPM acceleration. Accordingly, the engine torque control of the present disclosure implements a second APC equation based on the following iterative relationship:

$$APC_{k+1} = \frac{T - b_1 * APC_k^2 - b3}{b_2} \quad (4)$$

where:
  k is the current iteration; and
  k+1 is the next iteration.

$APC_K$ can be provided as the output of the first APC equation or can be a value that is determined based on the MAF sensor signal. In this manner, a square root calculation is avoided and there is no division by the coefficient $b_1$, which can approach zero in some instances. $APC_{ERR}$ is determined in accordance with the following relationship:

$$APC_{ERR} = \frac{APC_{k+1} - APC_K}{APC_K} \quad (5)$$

If $APC_{ERR}$ is greater than $ERR_{THR}$, the engine torque control uses the first APC equation (i.e., Equation 3) to determine APC. If $APC_{ERR}$ is less than $ERR_{THR}$, the engine torque control uses the second APC equation (i.e., Equation 4) to determine APC.

It is anticipated that the engine torque control can concurrently determine APC using the first and second equations, wherein the APC value provided by the first APC equation is used until the $APC_{ERR}$ associated with the APC value provided by the second APC equation is less than $ERR_{THR}$ a threshold number of times. In this manner, it is ensured that the APC value provided by the second APC equation is stable.

APC can be subsequently filtered (e.g., using a low-pass filter) and is processed using a compressed flow (CF) model to provide a desired throttle area ($A_{THRDES}$). More specifically, a desired mass air flow ($MAF_{DES}$) is determined based on the following relationship:

$$MAF_{DES} = \frac{APC \cdot R}{k_{CYL}} \qquad (6)$$

where $k_{CYL}$ is a cylinder constant. For example, $k_{CYL}$ is equal to 15 for an 8-cylinder engine, 20 for a 6-cylinder engine and 30 for a 4-cylinder engine. $A_{THRDES}$ is determined based on the following relationship:

$$A_{THRDES} = \frac{MAF_{DES} * \sqrt{R \cdot IAT}}{B \cdot \Phi \cdot \left(\frac{MAP}{B}\right)} \qquad (7)$$

where:
B is the measured barometric pressure;
R is the universal gas constant; and
$\Phi$ is a pressure factor.

$\Phi$ is based on a pressure ratio ($P_R$) according to the following relationships:

$$\Phi = \begin{cases} \sqrt{\frac{2\gamma}{\gamma-1}\left(1 - P_R^{\frac{\gamma-1}{\gamma}}\right)} & \text{if } P_R > P_{critical} = \left(\frac{2}{\gamma+1}\right)^{\frac{\gamma}{\gamma-1}} = 0.528 \\ \sqrt{\gamma \frac{2}{\gamma+1}^{\frac{\gamma+1}{(\gamma-1)}}} & \text{if } P_R \leq P_{critical} \end{cases} \qquad (8)$$

$P_R$ is the ratio of MAP to the ambient pressure ($P_{AMB}$) and $P_{CRITICAL}$. $P_{CRITICAL}$ is defined as the pressure ratio at which the velocity of the air flowing past the throttle equals the velocity of sound. This condition is called choked or critical flow. The critical pressure ratio is determined by:

$$P_{CRITICAL} = \left(\frac{2}{\gamma+1}\right)^{\gamma/\gamma-1} \qquad (9)$$

where $\gamma$ is equal to the ratio of specific heats for air and range from about 1.3 to about 1.4. The engine torque control subsequently regulates the throttle position based on $A_{THRDES}$ achieve $T_{REQ}$.

Figure 2:
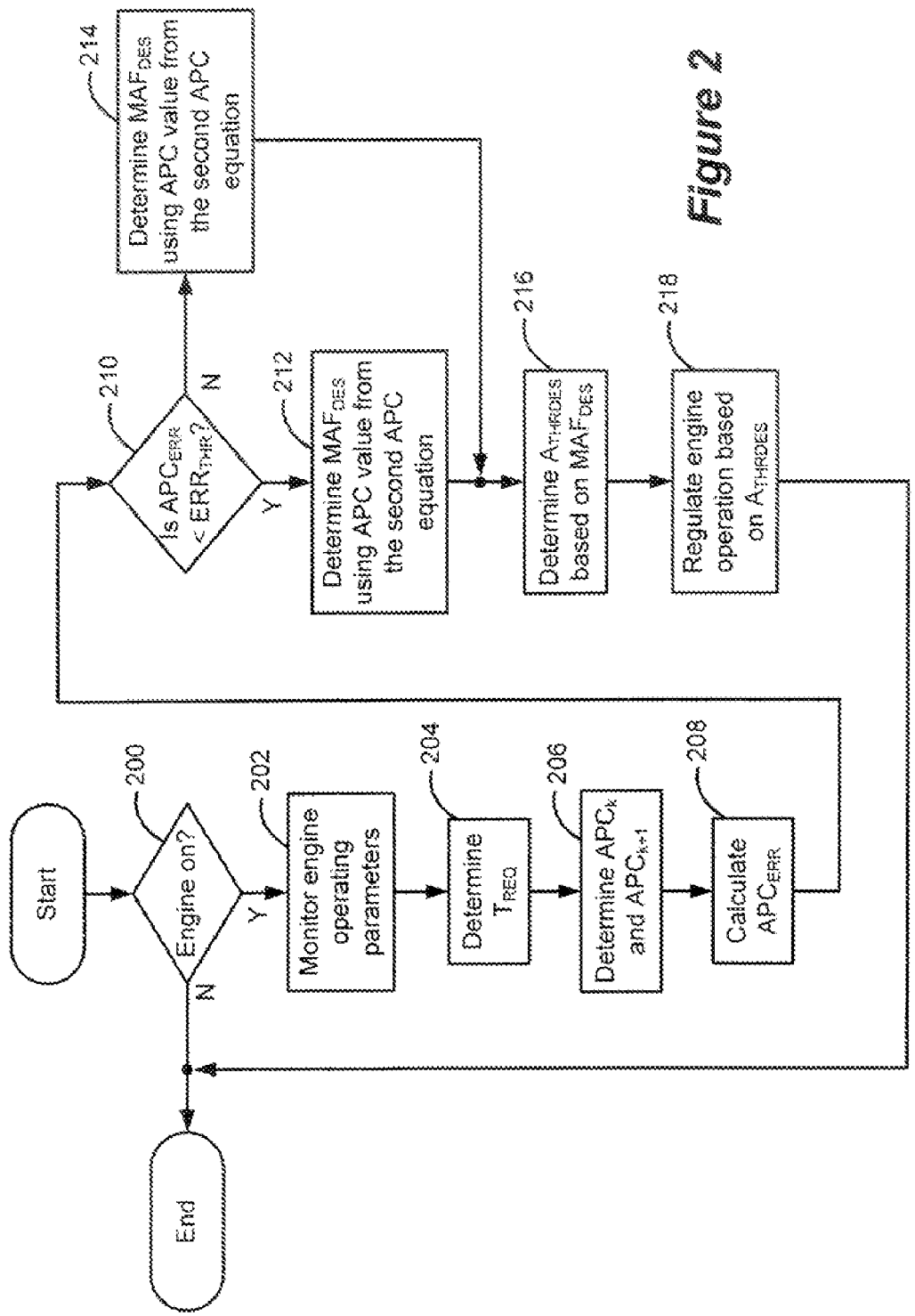
FIG. 2 is a flowchart illustrating steps executed by the engine torque control of the present disclosure.

Referring now to FIG. 2, exemplary steps executed by the engine torque control will be discussed in further detail. In step 200, control determines whether the engine is operating. If the engine is not operating, control ends. If the engine is operating, control monitors the engine operating parameters in step 202. In step 204, control determines $T_{REQ}$, as described in detail above. Control determines $A_k$ and $A_{k+1}$ in step 206. $A_k$ can be determined using the first APC equation (i.e., Equation 3) or can be determined based on the MAF sensor signal. $A_{k+1}$ is determined based on the second APC equation (i.e., Equation 3). In step 208, control determines $APC_{ERR}$.

Control determines whether $APC_{ERR}$ is less than $ERR_{THR}$ in step 210. If $APC_{ERR}$ is less than $ERR_{THR}$, control continues in step 212. If $APC_{ERR}$ is not less than $ERR_{THR}$, control continues in step 214. In step 212, control determines $MAF_{DES}$ using the APC value determined from the second APC equation (i.e., Equation 4). In step 214, control determines $MAF_{DES}$ using the APC value determined from the first APC equation (i.e., Equation 3). Control determines $A_{THRDES}$ based on $MAF_{DES}$ in step 216. In step 218, control regulates the engine operation based on $A_{THRDES}$ and control ends.

Figure 3:
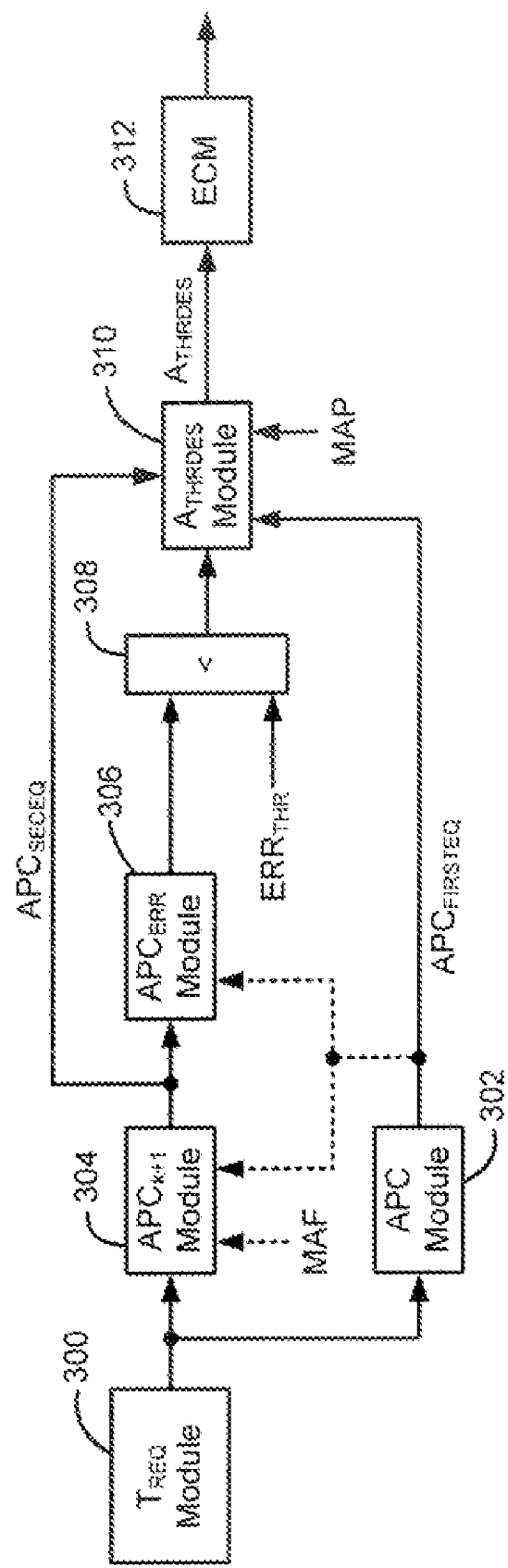
FIG. 3 is a block diagram illustrating modules that execute the engine torque control of the present disclosure.

Referring now to FIG. 3, exemplary modules that execute the engine torque control will be discussed. The exemplary modules include a $T_{REQ}$ module 300, an APC module 302, an $APC_{k+1}$ module 304, an $APC_{ERR}$ module 306, a comparator module 308, an $A_{THRDES}$ module 310 and an engine control module (ECM) 312. The TREQ module 300 determines $T_{REQ}$, as described above. The APC module 302 determines APC ($APC_{FIRSTEQ}$) based on $T_{REQ}$ using the first APC equation. The $APC_{k+1}$ module 304 determines $APC_{k+1}$ (or $APC_{SECEQ}$) based on $T_{REQ}$ using the second APC equation. $APC_{SECEQ}$ can be determined based on $APC_{FIRSTEQ}$ or MAF. Hence, these options are illustrated in phantom.

The $APC_{ERR}$ module 306 determines $APC_{ERR}$ based on either $APC_{SECEQ}$ or $APC_{FIRSTEQ}$. $APC_{ERR}$ is compared to $ERR_{THR}$ by the comparator module 308. The comparator module 308 generates a signal (e.g., 0 or 1) based on whether $APC_{ERR}$ is less than $ERR_{THR}$. For example, if $APC_{ERR}$ is less than $ERR_{THR}$, a signal equal to 1 is generated and is output to the $A_{THRDES}$ module. If $APC_{ERR}$ is not less than $ERR_{THR}$, a signal equal to 0 is generated. The $A_{THRDES}$ module 310 determines $A_{THRDES}$ based on MAP and either $APC_{FIRSTEQ}$ or $APC_{SECEQ}$, depending on the signal from the comparator module 308. More specifically, if the signal from the comparator module 308 is equal to 0, $A_{THRDES}$ is determined based on $APC_{FIRSTEQ}$. If the signal from the comparator module 308 is equal to 1, $A_{THRDES}$ is determined based on $APC_{SECEQ}$. The ECM 312 regulates engine operation based on $A_{THRDES}$.

Those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will become apparent to the skilled practitioner upon a study of the drawings, the specification and the following claims.

What is claimed is:

1. A method of achieving a desired torque output of an internal combustion engine, comprising:
    determining a first air-per-cylinder (APC) value based on a first APC relationship;
    determining a second APC value based on a second APC relationship;
    calculating an APC error based on said second APC value;
    regulating operation of said engine based on said first APC value when said APC error is greater than a threshold error; and
    regulating operation of said engine based on said second APC value when said APC error is not greater than said threshold error.

2. The method of claim 1 further comprising determining a torque request, wherein each of said first and second APC values is determined based on said torque request.

3. The method of claim 1 wherein said APC error is further determined based on said first APC value.

4. The method of claim 1 further comprising calculating a desired mass air flow (MAF) based on one of said first APC value and said second APC value.

5. The method of claim 4 further comprising calculating a desired throttle area based on said desired MAF, wherein engine operation is regulated based on said desired throttle area.

6. The method of claim 1 wherein each of said first and second APC relationships is determined based on an APC-based torque model of said engine.

7. The method of claim 1 wherein the first APC relationship is between said first APC value and a torque request that is generated based on an accelerator position.

8. The method of claim 1 wherein the second APC relationship is based on at least one of the first relationship and a mass air flow sensor signal.

9. The method of claim 1 wherein said regulating operation of said engine when said APC error is greater than said threshold error is independent of said second APC value, and
wherein said regulating operation of said engine when said APC error is not greater than said threshold error is based on said first APC value.

10. An engine control system for regulating a torque output of an internal combustion engine, comprising:
a first module that determines a first air-per-cylinder (APC) value based on a first APC relationship;
a second module that determines a second APC value based on a second APC relationship;
a third module that calculates an APC error based on said second APC value;
a fourth module that regulates operation of said engine based on said first APC value when said APC error is greater than a threshold error, and that regulates operation of said engine based on said second APC value when said APC error is not greater than said threshold error.

11. The engine control system of claim 10 further comprising a fifth module that determines a torque request, wherein each of said first and second APC values is determined based on said torque request.

12. The engine control system of claim 10 wherein said APC error is further determined based on said first APC value.

13. The engine control system of claim 10 further comprising a fifth module that calculates a desired mass air flow (MAF) based on one of said first APC value and said second APC value.

14. The engine control system of claim 13 wherein said fifth module calculates a desired throttle area based on said desired MAF, wherein engine operation is regulated based on said desired throttle area.

15. The engine control system of claim 10 wherein each of said first and second APC relationships is determined based on an APC-based torque model of said engine.

16. A method of regulating a torque output of an internal combustion engine, comprising:
providing an air-per-cylinder (APC) based torque model of said engine;
determining a first APC relationship using said APC-based torque model;
determining a second APC relationship, different from said first APC relationship, using said APC-based torque model;
calculating a first APC value based on said first APC relationship;
calculating a second APC value based on said second APC relationship;
calculating an APC error based on said second APC value;
regulating operation of said engine based on said first APC value when said APC error is greater than a threshold error; and
regulating operation of said engine based on said second APC value when said APC error is not greater than said threshold error.

17. The method of claim 16 further comprising determining a torque request, wherein each of said first and second APC values is determined based on said torque request.

18. The method of claim 16 wherein said APC error is further determined based on said first APC value.

19. The method of claim 16 further comprising calculating a desired mass air flow (MAF) based on one of said first APC value and said second APC value.

20. The method of claim 19 further comprising calculating a desired throttle area based on said desired MAF, wherein engine operation is regulated based on said desired throttle area.

* * * * *